Oct. 23, 1956 R. L. RULISON 2,768,100
SURFACE TREATMENT OF GERMANIUM CIRCUIT ELEMENTS
Filed Sept. 30, 1953
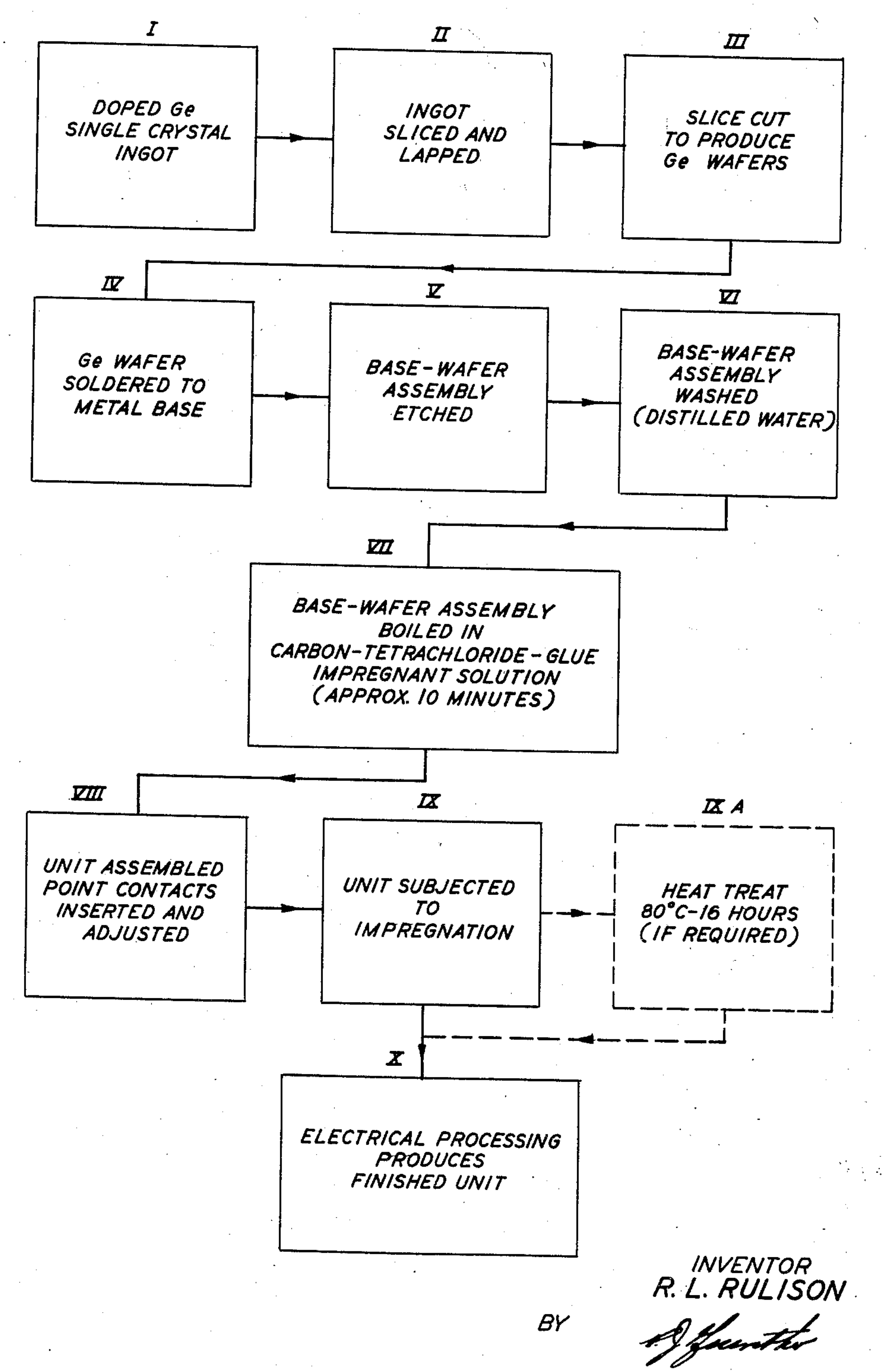
INVENTOR
R. L. RULISON
BY [signature]
ATTORNEY

United States Patent Office 2,768,100

Patented Oct. 23, 1956

2,768,100

SURFACE TREATMENT OF GERMANIUM CIRCUIT ELEMENTS

Raymond L. Rulison, Berkeley Heights, N. J., assignor to Bell Telephone Laboratories, Incorporated, New York, N. Y., a corporation of New York Application September 30, 1953, Serial No. 383,356

3 Claims. (Cl. 117—230)

This invention relates to the fabrication of semiconductor signal translating devices and more particularly to treatment of semiconductive bodies especially suitable for use in transistors.

The performance characteristics of semiconductor translating devices, such as rectifiers, photocells and transistors are dependent upon a multiplicity of factors a number of which are as yet not precisely determinable and some of which are subject to variation for unknown reasons. For example, it has been found that in the manufacture of transistors, such as of the type disclosed in Patent 2,524,035, granted October 3, 1950 to J. Bardeen and W. H. Brattain, units of a group processed in the identical maner exhibit substantial variations in their operating parameters such as the collector reverse saturation current, the emitter current for a specified bias and the emitter potential as a function of a specified collector bias. Thus, in manufacture, the yield of devices having performance parameters within preassigned limits may be low.

One general object of this invention is to increase the yield of semiconductor units which satisfy prescribed performance criteria, in mass quantity manufacture. More specific objects of this invention are to minimize the reverse saturation current of rectifying connections in germanium and silicon devices, such as of the collector connections in transistors, and to decrease variations in operating parameters of such devices.

In general, in accordance with one feature of this invention, semiconductor bodies for signal translating devices are subjected to a chemical treatment which minimizes variations in performance parameters, whereby in manufacture the yield of devices satisfying preassigned criteria is substantially increased.

More specifically, in accordance with one feature of this invention, semiconductor discs or wafers are treated in a solution of a glue impregnant in carbon tetrachloride at an elevated temperature.

In accordance with another feature of this invention, following the treatment above mentioned, contacts are brought to bear against the disc or wafer and the assembly is heat treated to stabilize the connections.

A better understanding of the invention may be had by reference to the drawing wherein there is disclosed in diagrammatic form an exemplary procedure for the fabrication of a semiconductive device using germanium.

In preparing germanium for use in circuit devices, the following procedure is employed: As indicated by block I of the diagram an ingot of single crystal germanium containing controlled amounts of impurities is prepared as disclosed for example in Patent 2,683,676 granted July 13, 1954, to J. B. Little and G. K. Teal. As further indicated by successive blocks of the diagram the ingot is sliced to produce slabs which may be subjected to mechanical polishing.

The slabs are further cut to produce wafers of suitable size for incorporation in a translating device. One surface of the wafer may now be copper-plated thus enabling a solder base connection to be made to a conductive backing member of some material such as brass. The base-wafer assembly is then subjected to an etching operation which may be in accordance with the disclosures of Patent 2,542,727 granted February 20, 1951, to H. C. Theuerer and Patent 2,619,414 granted November 25, 1952, to R. D. Heidenreich.

Next the chemical polish or etchant is removed by a rinse with some fluid such as high purity, double distilled water or methyl alcohol.

The base-wafer assembly is then placed in a solution composed of glue impregnant compound in carbon tetrachloride. The proportion of glue impregnant is relatively small. For example, a mixture of one part by volume to forty parts of carbon tetrachloride may be employed advantageously. The amount of glue impregnant may be varied in the range of ten percent more or less than the proportion noted above with completely satisfactory results.

Glue impregnant compounds generally are composed of polyisobutylene and polyethylene with a small amount of antioxidant. A typical example may consist of 92 percent polyisobutylene, 7½ percent polyethylene and ½ percent synthetic resin.

The solution is then heated to the boiling point and maintained in such condition for a short period of the order of ten minutes. At the expiration of the boiling period the wafer assembly is removed and air dried.

As is generally well known in the semiconductor fabrication art, it is important that contamination from uncontrollable sources be eliminated. To this end it is advantageous to perform the method of this invention using containers and tools of clean, non-reactive material such as glass. In adition, customary safety precautions must be observed with the use of carbon tetrachloride. It is advisable to provide positive exhausting means for the fumes from the boiling solution.

Following the boiling treatment step, the base-wafer unit is in condition to be employed in semiconductive devices. As indicated by block VIII the unit may be assembled in a cartridge type mount in ways known in the art.

As indicated by block IX of the diagram the units may be advantageously enclosed in a protective coating of a wax by the proces commonly referred to as impregnation. Additionally, during this step a protective membrane of vinyl resin lacquer may be applied over the wax coating.

As shown by the alternative step denoted IXA the assembled unit may then be heat treated at 80° C. for a period of about sixteen hours which serves to minimize the high emitter floating potential by reducing the surface leakage which lowers the resistance between the emitter and collector leads. The floating potential is customarily observed by applying five volts at the collector and taking a voltmeter reading in the emitter circuit. It has been found advantageous to heat treat only those units in which the floating potential exceeds two volts. The above-described heat treatment step may be conducted before the glue-impregnation step IX with a consequent reduction of the time of heat treatment to about one hour.

After the final steps of electrical processing and testing, the unit is in all respects ready for use. A brief resume of the results achieved through the use of the method of this invention will serve to illustrate its effectiveness. The following tabulation represents the test yields of successive batches of germanium dice of N conductivity type, one batch processed with and the other without the treatment of this invention. The figures shown represent the percentage of total units found satisfactory for the particular parameter indicated.

I. *Without treatment (155 units)*

| $I_{co}$ | $I_e$ (Rev.) | Peak | Deep Valley | Total yield good units |
|---|---|---|---|---|
| 66 | 87 | 81 | 50 | 22 |

II. *With treatment (105 units)*

| $I_{co}$ | $I_e$ (Rev.) | Peak | Deep Valley | Total yield good units |
|---|---|---|---|---|
| 90 | 99 | 83 | 73 | 59 |

By way of explanation of the above tabulation it may be noted that the total yields percentage-wise are considerably lower than the percentage found satisfactory for any one parameter. This is for the reason that the units represented by the total yield figure are those which satisfactorily met all four test requirements.

The parameters employed in the above tabulation represent those of particular significance in the acceptance or rejection of transistors of the point contact type in certain switching and computing circuit applications. By way of explanation in this illustrative example the first parameter, $I_{co}$, represents a saturation condition wherein with −7 volts applied to the collector the collector current must not exceed 0.7 of a milliampere. The value of $I_e$ (Rev.) must be an emitter current equal to or less than 0.1 milliampere with −10 volts applied to the emitter.

The parameters indicated as peak and deep valley represent criteria of the performance of the unit in specific circuit applications. More particularly they represent limiting values of emitter voltages in the following circuit arrangements. With 470 ohms resistance in both the base and collector electrodes and 8 volts negative applied to the collector the peak voltage observed conveniently by means of a vacuum tube voltmeter must fall within the range from 0.1 volt positive to 0.5 volt negative. The deep valley voltage must be equal to or less than 6 volts negative with no resistance in the base circuit, 470 ohms in the collector lead and 14 volts negative applied to the collector.

It will be noted that in the above tabulation involving a total of 260 units, an increase in yield of over 50 percent was attained. This improvement may be considered representative of the results achieved by the method of this invention.

What is claimed is:

1. The method of altering the electrical characteristics of a germanium body which comprises immersing said body in a solution composed essentially of one part by volume of a compound of polyethylene and polyisobutylene in forty parts by volume of carbon tetrachloride, heating said solution at the boiling point for a period of the order of ten minutes, and removing said body from said solution.

2. In the manufacture of transistors including a body of N conductivity type germanium, the method which comprises immersing the body in a boiling solution composed essentially of a compound of polyethylene and polyisobutylene in carbon tetrachloride, the polyisobutylene constituting about 90 percent of said compound and said compound being in the ratio of about one part by volume to forty parts of carbon tetrachloride, and removing said body from said solution.

3. In the manufacture of transistors the method of preparing a body of N conductivity type germanium which comprises immersing the body in a boiling solution composed of forty parts by volume of carbon tetrachloride and one part by volume of a compound of 92 percent by weight of polyisobutylene, 7½ percent by weight of polyethylene, and ½ percent by weight of synthetic resin for a period of ten minutes, and removing said body.

References Cited in the file of this patent

UNITED STATES PATENTS

| | | |
|---|---|---|
| 2,469,416 | Smyers | May 10, 1949 |
| 2,615,857 | Clarke | Oct. 28, 1952 |
| 2,663,652 | Railing | Dec. 22, 1953 |